US007072946B2

United States Patent
Shafer

(10) Patent No.: US 7,072,946 B2
(45) Date of Patent: *Jul. 4, 2006

(54) NETWORK ROUTER MANAGEMENT INTERFACE WITH API INVOKED VIA LOGIN STREAM

(75) Inventor: Philip Shafer, Raleigh, NC (US)

(73) Assignee: Juniper Networks, Inc., Sunnyvale, CA (US)

( * ) Notice: Subject to any disclaimer, the term of this patent is extended or adjusted under 35 U.S.C. 154(b) by 694 days.

This patent is subject to a terminal disclaimer.

(21) Appl. No.: 09/871,458

(22) Filed: May 31, 2001

(65) Prior Publication Data

US 2002/0191619 A1 Dec. 19, 2002

(51) Int. Cl.
*G06F 17/30* (2006.01)
(52) U.S. Cl. ............... 709/217; 709/313; 719/313; 707/102
(58) Field of Classification Search ............... 709/217, 709/218, 224, 227, 310, 300, 204, 226, 313, 709/220; 707/2, 102; 705/14; 719/328, 719/313; 715/513
See application file for complete search history.

(56) References Cited

U.S. PATENT DOCUMENTS 5,822,525 A * 10/1998 Tafoya et al. ............... 709/204
5,964,844 A * 10/1999 Rosenthal ................... 719/310
6,434,543 B1 * 8/2002 Goldberg et al. ............... 707/2
6,466,971 B1 * 10/2002 Humpleman et al. ....... 709/220
6,640,241 B1 * 10/2003 Ozzie et al. ................. 709/204
6,654,793 B1 * 11/2003 Wollrath et al. ............. 709/217
6,671,869 B1 * 12/2003 Davidson et al. ............. 716/17
6,735,630 B1 * 5/2004 Gelvin et al. ................ 709/224
6,766,368 B1 7/2004 Jakobson et al.
6,944,659 B1 9/2005 Taggart et al.
6,976,090 B1 * 12/2005 Ben-Shaul et al. ......... 709/246
6,980,993 B1 * 12/2005 Horvitz et al. .............. 707/102
2002/0178243 A1 11/2002 Collins

* cited by examiner

*Primary Examiner*—Khanh Quang Dinh
(74) *Attorney, Agent, or Firm*—Shumaker & Sieffert, P.A

(57) ABSTRACT

A network router management interface for use in configuring a router and obtaining operational information provides an application programming interface (API) that permits clients to formulate requests and receive replies according to an extensible markup language such as XML. The router may transform a login stream at a router command line interface (CLI) to implement the XML-based API. For example, the management server accepts input from the CLI and, upon receipt of a particular command from the client, transforms the CLI into a programmatic interface for exchange of XML-tagged requests and XML-tagged replies according to the XML-based API. Providing access to the XML-based API via the CLI login shell enables the use of standard login, security, authentication and authorization techniques.

39 Claims, 7 Drawing Sheets

NETWORK ROUTER MANAGEMENT INTERFACE WITH API INVOKED VIA LOGIN STREAM

TECHNICAL FIELD

The invention relates to computer networks and, more particularly, to managing network routers.

BACKGROUND

A computer network is a collection of interconnected computing devices that exchange data and share resources. In a packet-based network, such as the Internet, the computing devices communicate data by dividing the data into small blocks called packets. The packets are individually routed across the network from a source device to a destination device. The destination device extracts the data from the packets and assembles the data into its original form. Dividing the data into packets enables the source device to resend only those individual packets that may be lost during transmission.

Devices within the network, often referred to as routers, maintain tables of routing information that describe available routes through the network. Each route defines a path between two locations on the network. Upon receiving an incoming data packet, the router examines header information within the packet to identify the destination for the packet. Based on the header information, the router accesses the routing table, selects an appropriate route for the packet and forwards the packet accordingly.

A router management interface provides access to software modules and other resources residing on the router. In particular, the router management interface permits various entities, such as human users and automated scripts, to configure the router and obtain operational information. Using the router management interface, the entities can make changes to the present router configuration and more efficiently manage router resources, policies and relationships with other routers. In addition, the router management interface provides access to a variety of information relating to router configuration, protocols, firewalls, interfaces, router chassis inventory, system parameters, routing policies, forwarding options, network flow statistics, error logs, and performance metrics.

SUMMARY

The invention provides a network router management interface for use in configuring a router and obtaining operational information. The network router management interface provides an application programming interface (API) that permits clients to formulate requests and receive replies according to an extensible markup language, such as XML. XML is one example of an extensible markup language in the class encompassed by the Standard Generalized Markup Language (SGML) specification, and will be described herein for purposes of illustration. A network router management interface consistent with the principles of the invention offers a more robust and structured platform for processing of client requests and router output than conventional interfaces.

The invention may involve transformation of a command line interface (CLI) login stream into an XML-based API. In general, a client application may establish a secure connection with the router using a standard secure access protocol. Examples of suitable standard access protocols include Secure Shell (ssh) and Telnet. Other protocols, such as Secure Sockets Layer (SSL) and Simple Object Access Protocol (SOAP), also may be used in some applications. An access protocol client establishes a secure connection to the router, opens a login session, and starts a login shell. The access protocol client then transmits a command via the CLI that invokes direct communication between the client and a management server module on the router according to the XML API.

Clients may submit configuration requests, operational requests or both. Configuration requests include requests to change router configuration or obtain information about the current configuration. Operational requests include requests for information about router status such as network flow and performance. Based on data type definition (DTD) files or XML Schema language files, clients, such as human users or automated scripts, can encode the requests with XML tags. The self-describing XML tags map to information associated with the various software modules and other resources on the router.

A management server software module running on the router parses the XML-tagged requests and returns XML-tagged replies to the client. For example, the management server module may direct the XML-tagged requests to the appropriate software modules. In particular, the management server module may access a stored schema that maps the XML tags to information associated with appropriate software modules and other router resources. The software modules may include, for example, a chassis module, a device configuration module, and a routing protocol module. Some of the information associated with the software modules can be stored in a database on the router for access by the management server module and the software modules themselves.

The software modules may emit XML-tagged replies. In some cases, one or more of the software modules may emit replies in other formats, such as ASCII. The management server module can be configured to encode ASCII replies with XML tags before transmitting them to the client. For example, the management server module may merely "wrap" a raw ASCII reply in XML tags. In other instances, the management server module acts as a conduit for XML replies emitted by the software modules. In either case, the network router management interface transmits XML-tagged requests and replies, which are more readily parseable by client applications and the management server module alike.

The management server module offers clients an XML-based application programming interface (API) to streamline the process of accessing configuration and operational information. In some embodiments, the management server module may execute a process that modifies a login stream at a router command line interface (CLI) to automatically invoke the XML-based API. For example, the management server module accepts input from the CLI and, upon receipt of a particular command from the client, transforms the CLI into a programmatic interface for exchange of XML-tagged requests and XML-tagged replies according to the XML-based API. In some embodiments, the management server module can be configured to take the place of the CLI, assume control of the CLI access connection, and thereby transform the CLI login stream into a direct XML-based API. Providing access to the XML-based API via the CLI login shell enables the use of standard login, security, authentication and authorization techniques.

In one embodiment, the invention provides a method comprising establishing a secure connection between a network router and a client, initiating a command line interface (CLI) process on the network router, and receiving from the client a CLI command. In response to the CLI command, the method replaces the CLI process with a management server process that provides an extensible markup language-based application programming interface (API) to the client. A computer-readable medium that carries instructions for performing such a method is also contemplated.

In a further embodiment, the invention provides a network router management interface comprising a secure protocol module that provides a secure connection between a network router and a client, a command line interface (CLI) module that receives CLI commands from a client, and a management server module that receives the CLI commands from the CLI module and, in response to one of the CLI commands, accepts commands encoded in accordance with an extensible markup language.

In an added embodiment, the invention provides a network router management interface. The network router management interface includes a client interface that receives, from a network router client, configuration requests and operational requests encoded with extensible markup language tags. A storage device stores a network management interface schema that maps the extensible markup language tags to configuration and operational information associated with software modules running on a network router. The software modules include a chassis software module that defines an inventory of components in the network router chassis, a device configuration software module that defines a physical configuration of the network router, and a routing protocol module that administers protocols supported by the network router. A management server software module parses the configuration requests and the operational requests received at the client interface and accesses the corresponding configuration and operational information associated with the chassis software module, the device configuration software module, and the routing control software module according to the network management interface schema. In addition, the management server software module emits replies encoded with extensible markup language tags according to the network management interface schema.

In another embodiment, the invention provides a method comprising receiving, from a network router client, configuration requests and operational requests encoded with extensible markup language tags. The method further includes accessing a network management interface schema that maps the extensible markup language tags to configuration and operational information associated with software modules running on a network router. The software modules include a chassis software module that defines an inventory of components in the network router chassis, a device configuration software module that defines a physical configuration of the network router, and a routing protocol module that administers protocols supported by the network router. The method also includes parsing the configuration requests and the operational requests, and accessing the corresponding configuration and operational information associated with the chassis software module, the device configuration software module, and the routing control software module according to the network management interface schema. The method then includes emitting replies encoded with extensible markup language tags according to the network management interface schema. A computer-readable medium that carries instructions for performing such a method is also contemplated, as well as a computer-readable medium that carries the network management interface schema.

In a further embodiment, the invention provides a network router interface comprising a client interface that receives, from a client, requests encoded with extensible markup language tags. A management server accesses information associated with one or more software modules running on the router according to a schema that maps the tags to the information. In addition, the management server emits to the client interface replies encoded with extensible markup language tags.

In another embodiment, the invention provides a method comprising receiving, from a network router client, requests encoded with extensible markup language tags. The method obtains information associated with one or more software modules running on the network router according to a schema that maps the tags to the information. The method also emits to the network router client, replies encoded with extensible markup language tags. A computer-readable medium that carries instructions for performing such a method is also contemplated.

A network router management interface in accordance with the principles of the invention can provide a number of advantages, both in submitting requests to the router and in receiving router output. When receiving router output, for example, tag names and structural rules provided by a DTD of XML Schema Language file facilitate a better understanding of the content and structure of the data produced by the network router.

The tags make it much easier for client applications to parse router output and extract specific information, e.g., for use in network management applications. In particular, the parsing function of the client application does not need to be updated when the format or ordering of router output changes. Instead, such changes are reflected in the DTD or XML Schema Language file, while the resulting information is delimited by appropriate XML tags.

The parsing function simply relies on identification of elements between opening and closing XML tags to extract particular information in the router output. In this manner, the parsing performance of the client application is generally insensitive to changes in the position of elements within the output string, and can resist errors prevalent in existing parsing applications.

Tagged output is also easier to transform into different display formats. In particular, each client application is generally free to render the XML output to any desired format or appearance, providing significant flexibility to developers of network management systems. This flexibility is in contrast to many existing systems in which router output is fixed to a particular output format, such as eighty-column TTL output. Consequently, client applications can render output in a variety of formats that may be more appropriate for human viewing or machine processing, depending on the application.

When requesting information from a router, the XML API provides a true programmatic interface in which options for every command and all elements in configuration statements are well-defined. The XML tag names clearly indicate the function of an element in a command or configuration statement. The uniformity provided by the XML-based API liberates client application developers, who can concentrate less on basic command syntax and more on the design of value-added client applications for router configuration and network management.

Automatic transformation of an existing interface, such as a CLI, into an XML-based API permits the API to more readily coexist with legacy interfaces. Thus, a network router management interface in accordance with the principles of the invention may include a number of different interfaces including a CLI, an XML-based API, a script client interface (SCI), and can support a number of secure access methods. Moreover, providing access to the XML-based API via the CLI login shell enables the use of standard login, security, authentication and authorization techniques such as ssh, Telnet, SSL, SOAP and the like, which have been proven reliable.

The above summary of the invention is not intended to describe every embodiment of the invention. The details of one or more embodiments of the invention are set forth in the accompanying drawings and the description below. Other features, objects, and advantages of the invention will be apparent from the description and drawings, and from the claims.

DETAILED DESCRIPTION

A network router management interface in accordance with the principles of the invention provides an application programming interface (API) that permits clients to formulate requests and receive replies according to an extensible markup language such as XML. Router clients encode configuration requests and operational requests with extensible markup language tags. Likewise, a management server module running on the router encodes replies with extensible markup language tags.

The tags map to corresponding configuration and operational information associated with software modules running on the router. In this manner, the network router management interface provides structured input and output that is readily parseable and capable of adaptation to changes in the format or syntax of information emitted by the router. In particular, the streams of tags emitted by the client application and management server constitute a well-formed extensible markup language document that obeys the structural rules defined in a DTD or XML Schema Language file for the type of information exchanged. Moreover, client applications are free to render the output in a flexible manner for a given application.

In accordance with the invention, the XML API can be accessed by transforming a command line interface (CLI) login stream. In general, a client application may establish a secure connection with the router using a standard secure access protocol. An access protocol client establishes a secure connection to the router, opens a login session, and starts a login shell. The access protocol client then transmits a command via the CLI that invokes direct communication between the client and a management server module on the router according to the XML API. Providing access to the XML-based API via the CLI login shell enables the use of standard login, security, authentication and authorization techniques.

Figure 1:
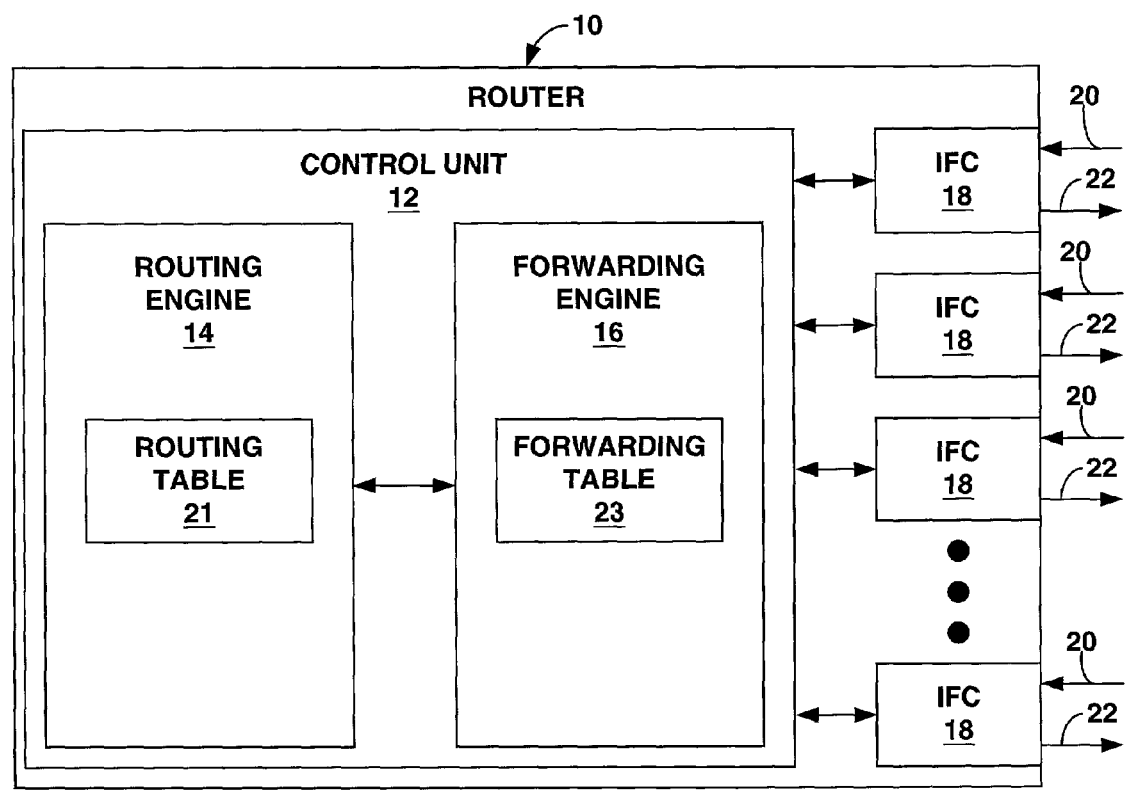
FIG. 1 is a block diagram illustrating an example network router consistent with the principles of the invention.

FIG. 1 is a block diagram illustrating an example network router 10 appropriate for incorporation of a network router management interface in accordance with the principles of the invention. Network router 10 receives and forwards data packets across a network. As shown in FIG. 1, router 10 includes a control unit 12 with a packet routing engine 14 and a packet forwarding engine 16. Router 10 also includes one or more interface cards (IFCs) 18 for receiving and sending data packets via network links 20 and 22, respectively. Control unit 12 routes inbound packets received from inbound link 20 to the appropriate outbound link 22. Control unit 12 routes packets according to routing information stored in routing table 21, and may include a processor or other control logic. Instructions for causing a processor provided in router 10 to perform methods as described herein may be stored on any of a variety of computer readable media.

Routing engine 14 maintains and updates the routing information within routing table 21. Forwarding engine 16 analyzes the contents of routing table 21 prior to receiving packets and pre-selects routes to be used when forwarding packets. Forwarding engine 16 then stores the selected routes in forwarding table 23. Upon receiving an inbound packet, forwarding engine 16 examines information within the packet to identify the destination of the packet. Based on the destination, forwarding engine 16 selects an available route and forwards the packet to one of the IFCs 18. IFCs 18 may be configured according to one of several different network protocols.

Figure 2:
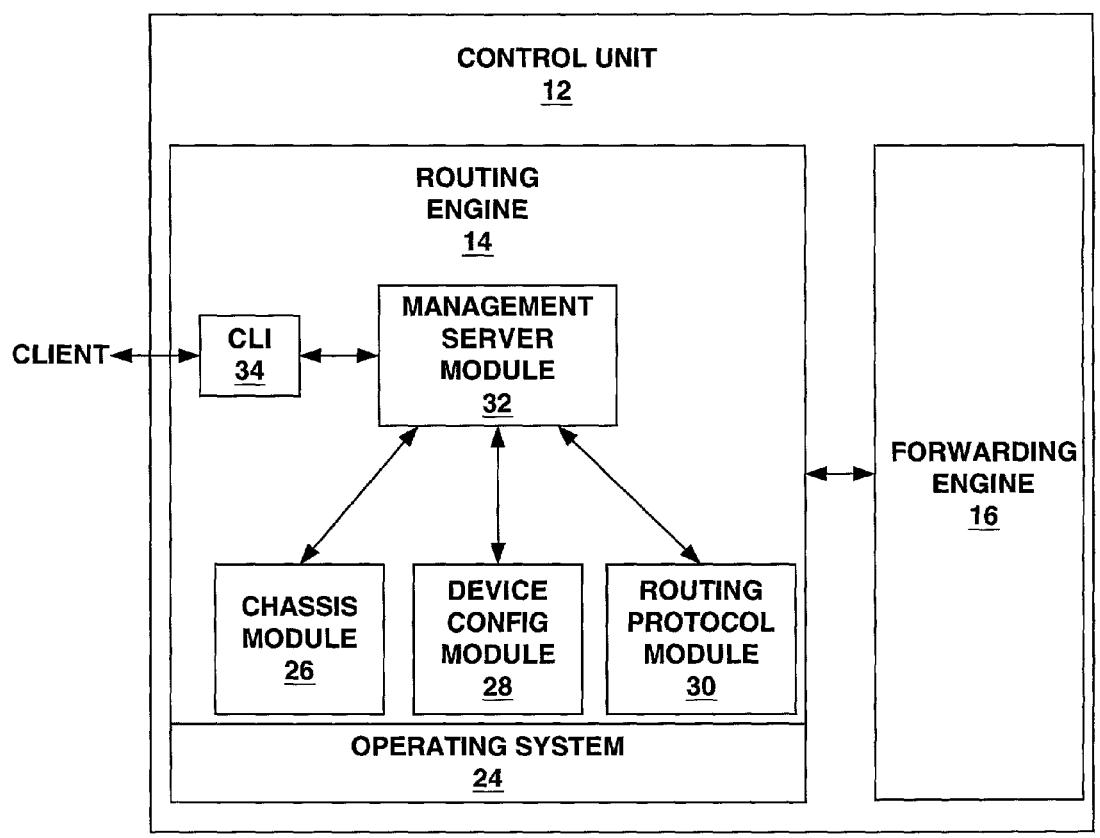
FIG. 2 is a block diagram illustrating a router control unit incorporating a management interface consistent with the principles of the invention.

FIG. 2 is a block diagram illustrating an example router control unit 12 incorporating a management interface consistent with the principles of the invention. In the example of FIG. 2, control unit 12 includes packet routing engine 14 and packet forwarding engine 16. Within control unit 12, routing engine 14 provides a management interface that interacts with a number of software modules running within an operating environment provided by operating system 24. Operating system 24 provides a multi-tasking operating system for execution of a number of concurrent processes. An example of such an operating system is FreeBSD, which is an advanced UNIX operating system that is compatible with a number of programmable processors (not shown), including processors commercially available from Intel Corporation.

As examples, routing engine 14 may include a chassis module 26, a device configuration module 28, and a routing protocol module 30 running as processes within the operating environment of operating system 24. A management server module 32 provides a user interface for interaction with software modules 26, 28, 30. Chassis module 24 defines an inventory and status of components installed in the chassis of network router 10, including IFCs 18. Device configuration module 28 defines and controls the physical configuration of network router 10. Routing protocol module 30 administers protocols supported by network router 10. For example, routing protocol module 30 may implement protocols for exchanging route information with other routing devices and for updating routing table 21 (shown in FIG. 1).

Management server module 32 communicates with one or more client interface modules running on routing engine 14. In the example of FIG. 2, management server module 32 communicates with a command line interface (CLI) module 34. CLI module 34 serves as a daemon process that listens for requests from clients. In some embodiments, CLI module 34 may give way to direct communication between clients and management server module 32, e.g., via script commands such as JUNOScript commands. The clients may take the form of human users such as system administrators or automated script applications. Initially, command line interface module 34 listens for CLI commands, and passes them to management server module 32 for handling. In accordance with the principles of the invention, however, the command line interface presented by control unit 12 is dynamically replaced with an XML-based API upon receipt of a particular CLI command from a client. More specifically, upon receipt of the command, referred to herein as the "xml-mode" command, management server module 32 receives subsequent incoming commands directly and, as described below, services the XML encoded CLI commands based on the XML API.

Figure 3:
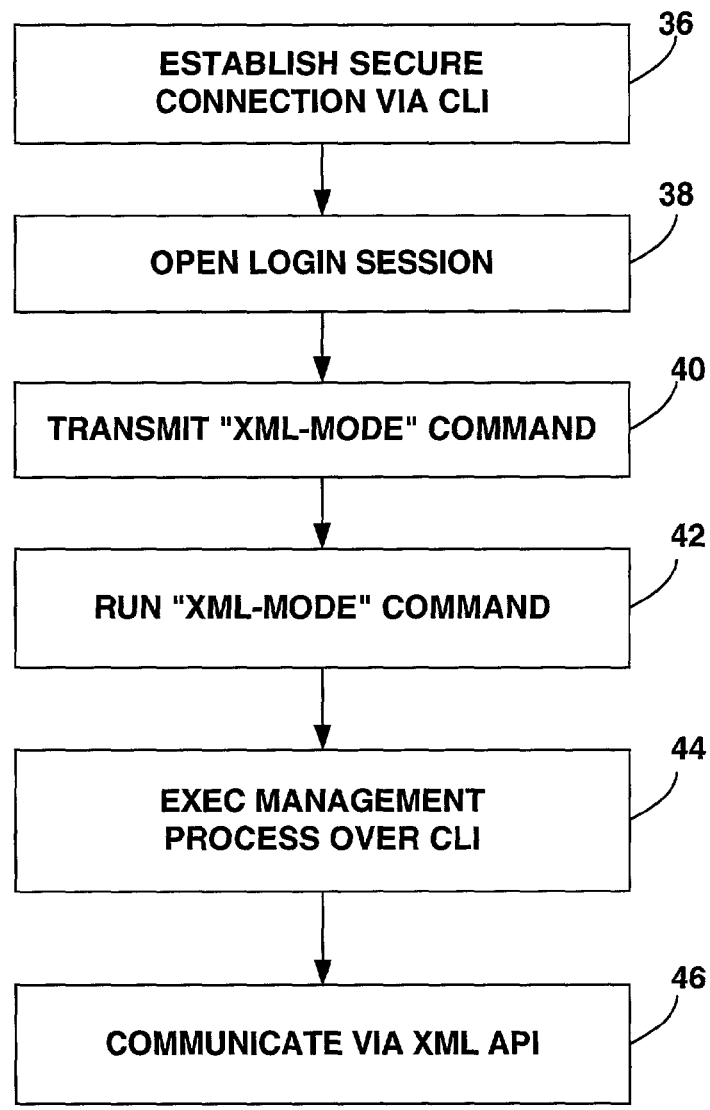
FIG. 3 is flow diagram illustrating transformation of a CLI login stream into an XML-based API.

FIG. 3 is flow diagram illustrating a technique for transformation of a CLI login stream into an XML-based API. In general, a client application establishes a secure connection (36) to router 10, e.g., using a standard access protocol. Typically, an access protocol client running on the client machine creates an encrypted connection with an access protocol daemon on router 10 and exchanges authorization information. The access protocol daemon opens a login session (38) with router 10, and starts a login shell with CLI module 34. The client application typically will include a standard programming library with one or more routines for establishing a connection to a remote machine. The client application may use one of those routines to establish the connection, and then invoke the access protocol. Advantageously, the client application may use a standardized access protocol client to create the connection.

The access protocol client preferably creates a secure communication channel that is both authenticated and encrypted. One effective protocol for establishing the secure channel is ssh. Alternative access methods such as Telnet, SSL, or SOAP also may be useful in some applications. The ssh protocol uses public-private key technology for effective encryption, and is widely accepted as a reliable protocol for secure communication. In operation, an ssh client running on the client application machine provides a password to an ssh daemon running on packet routing engine 14. The ssh client can obtain the password from an ssh-agent program that provides key management, a local disk location where the password is stored, or as authentication information entered by a user.

Figure 4:
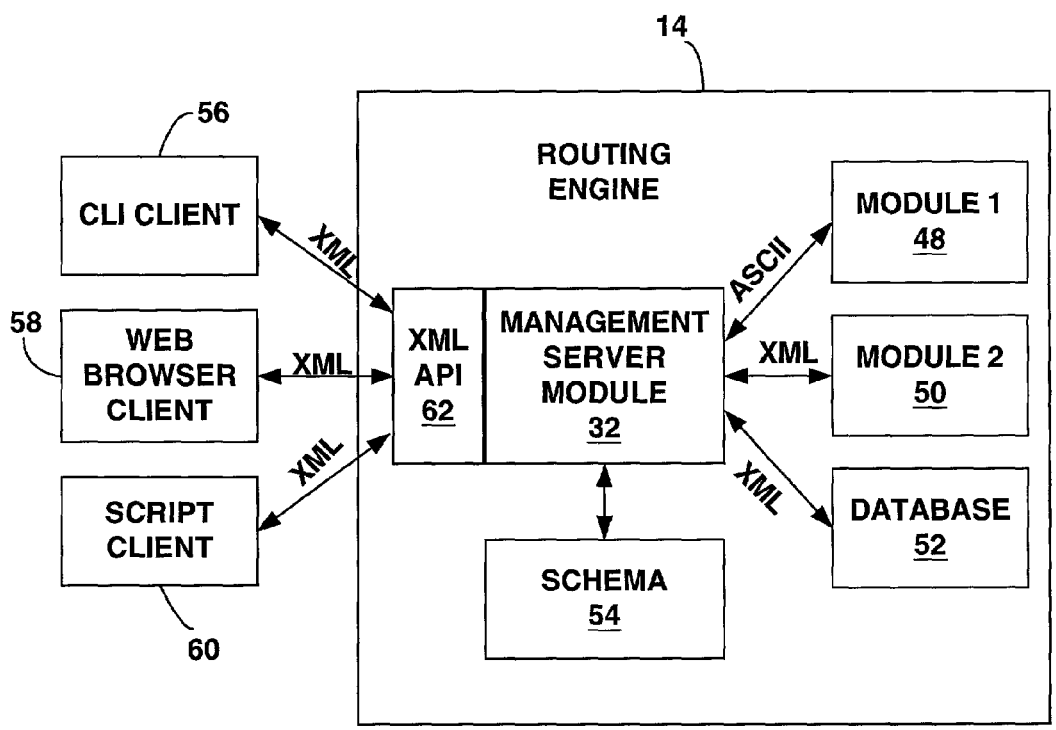
FIG. 4 is a block diagram illustrating a network router incorporating a management interface that supports an XML-based API.

The access protocol client transmits an "xml-mode" command (40) to CLI module 34. In response, CLI module 34 executes the xml-mode command (42), which transforms the existing CLI connection into a communication path for the XML-based API. In one embodiment, management server module 32 replaces CLI module 34, e.g., using the UNIX Exec command (44). The client application then communicates directly with management server module 32 using the XML-based API presented by management server module 32 (46) and the existing communication channel. Following execution of the Exec command, management server module 32 assumes control of the access session previously opened between CLI module 34 and the access protocol client on the client machine. At that point, the router presents the XML API to the client application, and management server module 32, in effect, acts as a web server. FIG. 4 is a block diagram illustrating a network router incorporating a management interface that supports an XML-based API. XML is one example of an extensible markup language in the class encompassed by the Standard Generalized Markup Language (SGML) specification, and will be described herein for purposes of illustration. The official XML specification is governed by the World Wide Web Consortium and is available on the web at http://www.w3.org/TR/REC-xml. The structure of the XML tags communicated via the XML API may be defined using Data Type Definition (DTD) files, XML Schema Language files, or other similar devices for XML tag definition. As an example, the XML tags may conform to the evolving JUNOScript™ API developed by Juniper Networks, Inc. of Sunnyvale, Calif. The JUNOScript™ API is described, for example, in JUNOScript™ API Guide and Reference, Version 4.3, available from Juniper Networks, Inc., the entire content of which is incorporated herein by reference.

In the example of FIG. 4, management server module 32 accesses one or more software modules 48, 50 running on routing engine 14, as well as other router resources such as router configuration database 52, to serve client requests. Software modules 48, 50 may include a variety of software modules such as chassis module 26, device configuration module 28, and routing protocol module 30 described with reference to FIG. 2. Router configuration database 52 may store information associated with software modules 48, 50 and router hardware such as configuration information. Management server module 32 may obtain operational information from software module 48, 50, indicating operational status of the router. A management interface schema 54 maps extensible markup language tags received by management server module 32 to information associated with software modules 48, 50, including the information in database 52 and information that may be obtained directly from software modules 48, 50. Schema 54 may take the form of a data definition language (DDL) file, and can be stored on hard disk or other data storage medium.

A variety of clients such as CLI client 56, web browser client 58, or script client 60 may establish independent communication sessions with management server module 32. Management server module 32 presents to each client 56, 58, 60 an XML API 62, which can be made accessible by the secure CLI login process described above with reference to FIG. 3. CLI client 56 may take the form of a remote computer operated by a human user who enters CLI commands encoded with XML tags that conform to the API. In this case, CLI client application 56 may render the XML output received from management server module 32 as command line output. Web browser client 58 may graphically render the XML output for human users, e.g., using style sheets communicated or identified by management server module 32 with particular XML replies. Script client 60 may take the form of an automated script application running on a client computer, and may render XML output into reports, logs, and the like. In addition, script client 60 may respond to XML replies with additional requests according to script code loaded into the script client.

In operation, management server module 32 receives both configuration requests and operational requests encoded with XML tags from clients 56, 58, 60. Configuration requests include requests to change router configuration or obtain information about the current configuration. Management server module 32 can make changes to the router configuration by modifying configuration records in database 52. The configuration information may be stored hierarchically in database 52, which may reside on a hard disk or other data storage medium. Operational requests include requests for information about router status such as network flow and performance. Management server module 32 can obtain operational information from database 52 or directly from modules 48, 50.

Management server module 32 serves requests received from clients 56, 58, 60 by parsing the extensible markup language tags, and accessing schema 54 to map the tags to pertinent configuration or operational information associated with modules 48, 50, database 52, or both. The tags may include, for example, chassis tags pertaining to information about the chassis components installed in the router chassis, device configuration tags pertaining to information about the physical configuration of the network router, and routing protocol tags pertaining to information about the protocols supported by the network router. Upon accessing the corresponding configuration and operational information according to the network management interface schema, management server module 32 emits replies encoded with extensible markup language tags.

Clients 56, 58, 60 parse the respective XML replies, extract pertinent information, and render the XML output as specified by the client application. Client applications 56, 58, 60 may parse the XML tags in the replies using a parser that implements a standard API such as the Document Object Model (DOM) or Simple API for XML (SAX). DOM implementations are available for several programming languages, including C, C++, Perl, and Java. Management server module 32 may parse the requests using a similar API. XML API 62 greatly facilitates the parsing of requests and replies. Tag names and structural rules provided by a DTD or XML Schema Language file make the tag streams highly structured and predictable.

When a client 56, 58 or 60 needs to extract a specific piece of data from formatted ASCII output, it must rely on the location of the data within the output string. Unfortunately, if the number of characters in the output is unpredictable, or the format or ordering of the output changes as new software versions are introduced, the parsing function must be updated manually to avoid an error. On the contrary, with XML-encoded output provided by XML API 62, the XML tags describe and delimit each element of information in a structure manner. As a result, the parsing routines executing within clients 56, 58 and 60 are able to extract information between adjacent opening and closing tags, without regard to position within the output string. Thus, adding an new tag in the future does not affect the ability of a client application to parse existing tags and extract their contents.

With further reference to FIG. 4, management server module 32 may receive output from software modules 48, 50 or database 52 in either XML or ASCII format. In particular, some of the router resources 48, 50, 52 may be configured to emit XML-encoded output, while others may simply emit ASCII output. When management server module 32 receives XML-encoded output, it may simply act as a conduit and communicate the output to a client application 56, 58, 60. If management server module 32 receives ASCII output, however, it can be configured to encode the ASCII output with XML tags before sending it to a client application 56, 58, 60. Thus, in some instances, management server module 32 may "wrap" the ASCII output in XML tags to present replies that conform to XML API 62. Management server module 32 accesses one or more DTD or XML Schema Language files for router 10 to ensure that the tags conform.

The following are some examples of operational and configuration requests made by client applications 56, 58, 60 according to XML API 62 and corresponding replies emitted by management server module 32. The examples are from the JUNOScript™ API. Again, an operational request may be a request for information about router status. As a first example, the following request is for detailed information about a router interface called "ge-2/3/0":

```
<rpc>
    <get-interface-information>
        <interface-name>ge-2/3/0</interface-name>
        <detail/>
    </get-interface-information>
</rpc>
```

The above request opens and closes with the <rpc> tag, which encapsulates all client requests. The <get-interface-information> tags specify a class of information, while <interface-name> ge-2/3/0</interface-name> designates a specific interface. The tag <detail/> designates the amount of detail desired in the reply. If less detail is required, a tag such as <terse/> could be used.

A configuration request involves a request to change router configuration or for information about the current candidate configuration. The candidate configuration usually matches the configuration currently in use on the router, but the two can diverge if there are uncommitted changes to the candidate configuration. As a second example, the following request asks for information at the [edit system login] level of the current candidate configuration:

```
<rpc>
    <get-configuration>
        <configuration>
            <system>
                <login/>
            </system>
        </configuration>
    </get-configuration>
</rpc>
```

Notably, the hierarchical structure of the request makes it readily parseable by management server module 32.

The reply from management server module 32 for the operational request described above provides reply tags for all of the request tags, as specified by XML API 62. For example, management server module 32 returns the information requested by the <get-interface-information> tag in a response tag called <interface-information>, and the information requested by the <get-chassis-inventory> tag in a response tag called <chassis-inventory>. The following sample reply includes information about the interface called "ge-2/3/0":

```
<rpc-reply>
    <interface-information>
        <interface-name>ge-2/3/0</interface-name>
        <interface-index>20</interface-index>
```

-continued

```
            .
            .
            .
        </interface-information>
    </rpc-reply>
```

In this example, each reply provided by management server module 32 includes the opening and closing tags <rpc-reply> and </rpc-reply>. Note that a large number of child tags may be included in the reply, as indicated by the ellipsis above.

The following is an example response to the above-described configuration request for information at the [edit system login] level of the configuration hierarchy. For the sake of brevity, this example assumes there is only one user defined at this level:

```
<rpc-reply>
    <configuration>
        <system>
            <login>
                <user>
                    <name>admin</name>
                    <full-name>Administrator</full-name>
                </user>
            </login>
        </system>
    </configuration>
</rpc-reply>
```

Again, XML API 62 specifies the reply tags for the response tags submitted by the client application. For configuration change requests, management server module 32 emits a confirmation that the change has been made. For example, management server module 32 may simply emit a pair of opening and closing reply tags "<rpc-reply>" and "</rpc-reply>" tag with nothing between them. Receipt of the reply tags signifies an acknowledgement that the change has been completed.

Figure 5:
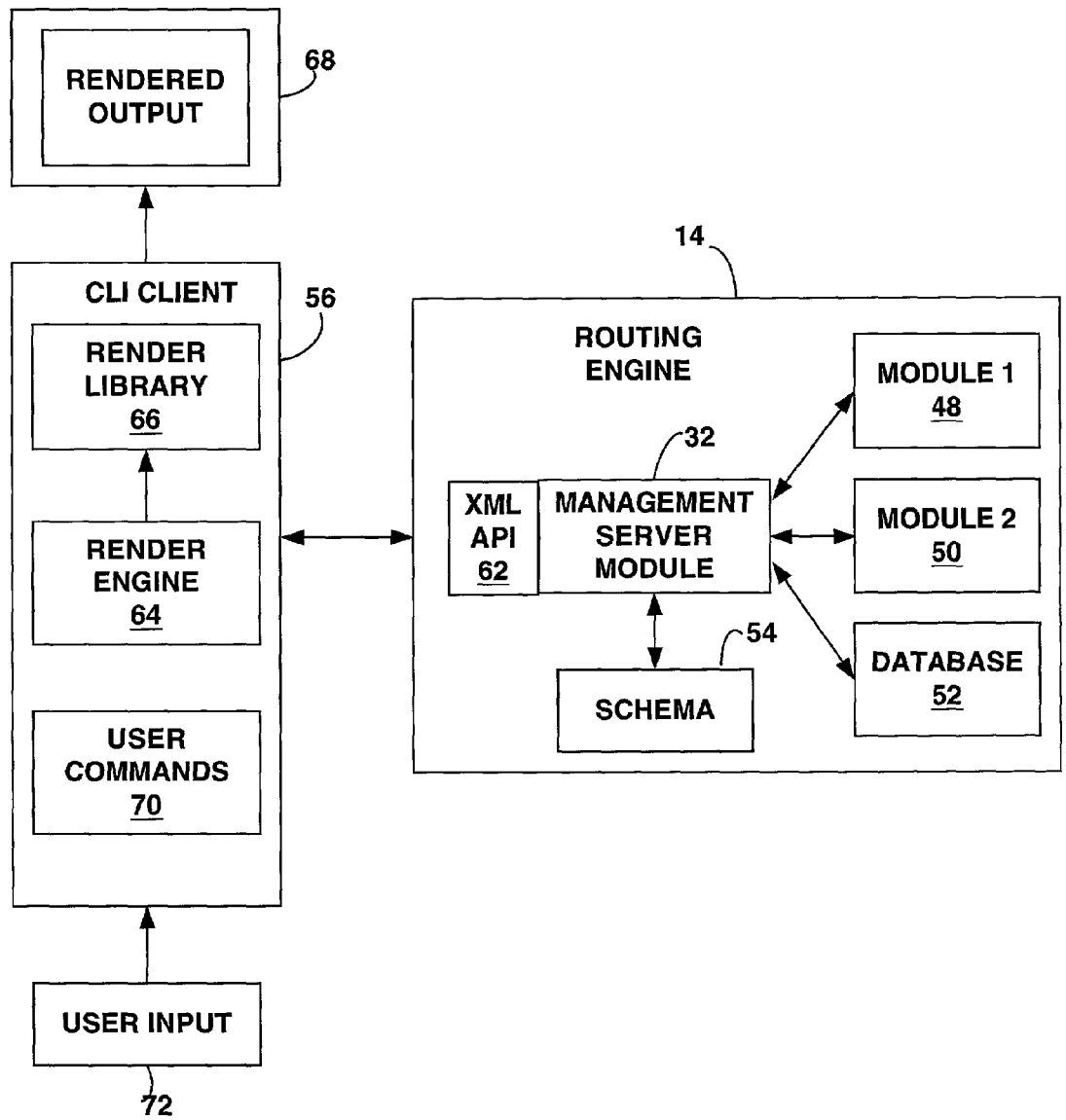
FIG. 5 is a block diagram depicting a network router management interface in communication with a CLI client.

FIG. 5 is a block diagram depicting a network router management interface in communication with a CLI client 56. In general, the network router management interface includes software modules residing on router 10 for interaction with client applications such as CLI client 56. As shown in FIG. 5, CLI client 56 may include a render engine 64, render library 66, and a display device 68 for displaying rendered output. In addition, CLI client 56 emits user commands 70 based on user input 72. Render engine 64 parses the XML replies received from management server module 32, and renders the extracted information to a human-readable format using render library 66. Render library 66 may contain style sheets, object definition language (ODL) files, and the like necessary to textually or graphically render the XML output on display device 68. In some instances, the output may simply be rendered as text at the command line. User input 72 may take the form of keystrokes, mouse clicks and the like, as entered by a human user associated with a machine executing CLI client application 56.

Figure 6:
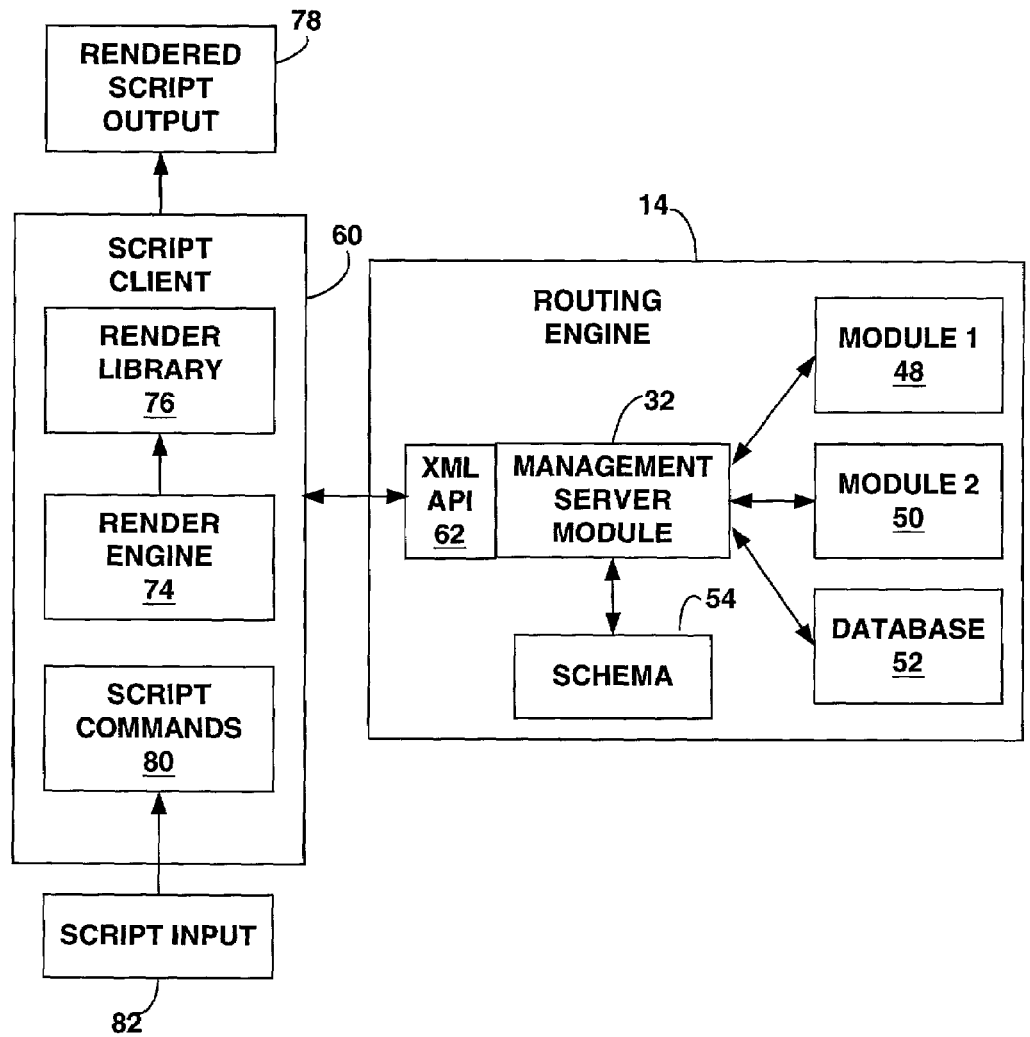
FIG. 6 is a block diagram depicting a network router management interface in communication with a script client application.

FIG. 6 is a block diagram depicting a network router management interface in communication with a script client application 60. Like CLI client application 56 of FIG. 5, script client application 60 may include a render engine 74 and render library 76 that together produce rendered script output 78. The rendered script output may be loaded into tables, logs, records, or other files for archival. Script client application 60 formulates script commands 80 according to script input 82 complied from program code and the requirements of XML API 62. In this manner, script client application 60 communicates configuration and operational requests encoded with XML tags. Arrangements similar to those shown in FIG. 5 and FIG. 6 can be provided for web browser client 58.

Figure 7:
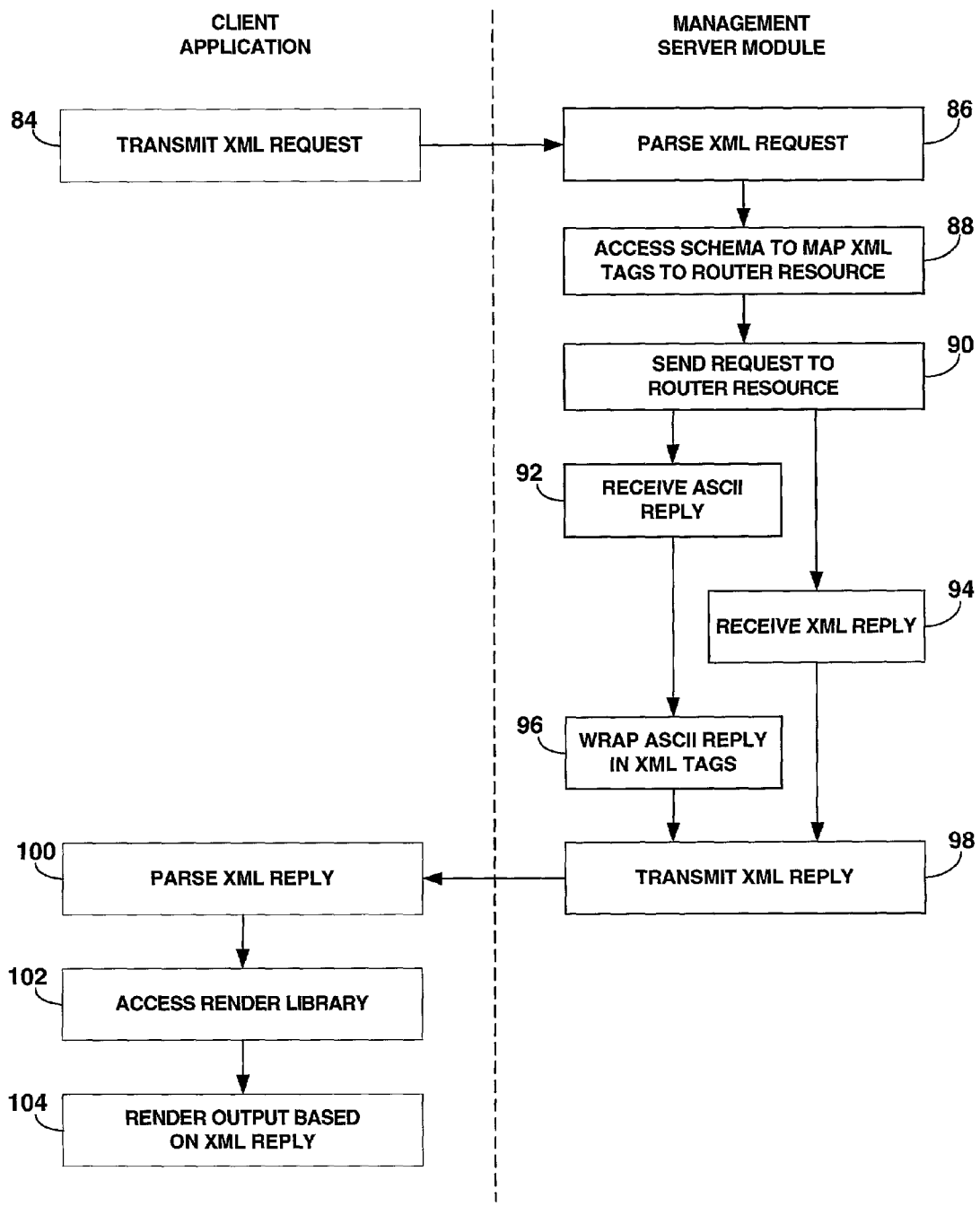
FIG. 7 is a flow diagram illustrating interaction between a client and a management server on a network router.

FIG. 7 is a flow diagram illustrating interaction between a client application and a management server module on a network router. As shown in FIG. 7, the client application transmits an XML request (84) via the XML API. Management server module 32 parses the XML request (86) and then accesses the network management interface schema to map the XML tags to information associated with particular router resources (88) such as software modules 48, 50 or database 52 (FIG. 3). Upon identifying the source of the appropriate information, management server module 32 sends the request to a corresponding router resource (90).

If management server module 32 receives an ASCII format reply from the router resource (92), it "wraps" the ASCII format reply in appropriate XML tags (96) specified by the XML API 62. If management server module 32 receives an XML-encoded reply (94), there may be no need for additional encoding. In each case, management server module 32 transmits the XML-encoded reply to the client application (98). The client application parses the XML reply (100), accesses the render library (102) for rendering support, and renders output based on the contents of the XML reply (104) and style sheets, ODL files, or other information provided by the render library. To avoid congestion, the client application typically waits for a reply before transmitting another request.

When a client application is finished making requests, it may end the session by emitting an empty <request-end-session/> tag within <rpc> tags. Management server module 32 then emits an <end-session/> tag enclosed in <rpc-reply> tags. The client application waits to receive this reply before emitting its closing session tag. The client application can then close the communication channel, e.g., ssh, by using a routine defined for that purpose in the standard library for the client application programming language.

Various embodiments of the invention have been described. These and other embodiments are within the scope of the following claims.

The invention claimed is:

1. A method comprising:
   establishing a secure connection between a network router and a client;
   initiating a command line interface (CLI) process on the network router;
   receiving from the client a CLI command; and
   in response to the CLI command, accepting commands encoded in accordance with an extensible markup language, wherein accepting commands comprises replacing the CLI process with a management server process in response to the CLI command, wherein the management server process provides an extensible markup language-based application programming interface (API) to the client.

2. The method of claim 1, further comprising:
   receiving from the client configuration requests and operational requests encoded with extensible markup language tags;
   accessing a network management interface schema that maps the extensible markup language tags to configuration and operational information associated with software modules running on the network router, the software modules including a chassis software module that defines an inventory of components in the network router chassis, a device configuration software module that defines a physical configuration of the network router, and a routing protocol module that administers protocols supported by the network router;

parsing the configuration requests and the operational requests;

accessing the corresponding configuration and operational information associated with the chassis software module, the device configuration software module, and the routing control software module according to the network management interface schema; and emitting replies encoded with extensible markup language tags according to the network management interface schema.

3. The method of claim 2, wherein the tags include chassis tags that define output for the chassis software module, device configuration tags that define output for the routing protocol software module.

4. The method of claim 2, further comprising receiving at least some of the replies encoded with extensible markup language tags from one or more of the software modules.

5. The method of claim 2, further comprising encoding at least some of the replies with extensible markup language tags based on non-encoded replies received from one or more of the software modules.

6. The method of claim 5, wherein the non-encoded replies include ASCII replies, the method further comprising encoding the ASCII replies in extensible markup language tags to form the encoded replies.

7. The method of claim 2, wherein the extensible markup language tags are defined by one or more data type of definition (DTD) files.

8. The method of claim 2, wherein the extensible markup language tags are defined by one or more XML Schema Language files.

9. The method of claim 2, wherein the configuration requests includes requests to change an existing configuration of the network router, the method further comprising interacting with one or more of the software modules to effect the requested change.

10. The method of claim 2, wherein the extensible markup language is XML.

11. The method of claim 2, wherein the network router includes a packet routing engine that specifies one or more routes for data packets, and a packet forwarding engine that forwards the data packets according to the specified routes, and the method is performed in part as a process within an operating environment executing on the packet routing engine.

12. The method of claim 2, further comprising:

receiving from the client, following the replacement of the CLI process, configuration requests and operational requests encoded with extensible markup language tags;

accessing a schema that maps the tags to configuration and operational information associated with a chassis module, a device configuration module, and a routing protocol module running on a network router;

accessing the information associated with the software modules; and emitting replies encoded with extensible markup language tags according to the schema.

13. A computer-readable medium carrying instructions to cause a programmable processor to:

establish a secure connection between a network router and a client;

initiate a command line interface (CLI) process on the network router;

receive from the client a CLI command; and in response to the CLI command, accept commands encoded in accordance with an extensible markup language by replacing the CLI process with a management server process in response to the CLI command, wherein the management server process provides an extensible markup language-based application programming interface (API) to the client.

14. The computer-readable medium of claim 13, wherein the instructions cause the processor to:

receive from the client configuration requests and operational requests encoded with extensible markup language tags;

access a network management interface schema that maps the extensible markup language tags to configuration and operational information associated with software modules running on the network router, the software modules including a chassis software module that defines an inventory of components in the network router chassis, a device configuration software module that defines a physical configuration of the network router, and a routing protocol module that administers protocols supported by the network server;

parse the configuration requests and the operational requests;

access the corresponding configuration and operational information associated with the chassis software module, the device configuration software module, and the routing control software module according to the network management interface schema; and emit replies encoded with extensible markup language tags according to the network management interface schema.

15. The computer-readable medium of claim 14, wherein the tags include chassis tags that define output for the chassis software module, device configuration tags that define output for the device configuration software module, and routing protocol tags that define output for the routing protocol software module.

16. The computer-readable medium of claim 14, wherein at least some of the replies encoded with extensible markup language tags from one or more of the software modules.

17. The computer-readable medium of claim 14, wherein the instructions cause the processor to encode at least some of the replies with extensible markup language tags based on non-encoded replies received from one or more of the software modules.

18. The computer-readable medium of claim 14, wherein the non-encoded replies include ASCII replies, the method further comprising encoding the ASCII replies in extensible markup language tags to form the encoded replies.

19. The computer-readable medium of claim 14, wherein the extensible markup language tags are defined by one or more data type definition (DTD) files.

20. The computer-readable medium of claim 14, wherein the extensible markup language tags are defined by one or more XML Schema Language files.

21. The computer-readable medium of claim 14, wherein the configuration requests include requests to change an existing configuration of the network router, wherein the instructions cause the processor to interact with one or more of the software modules to effect the requested change.

22. The computer-readable medium of claim 14, wherein the extensible markup language is XML.

23. The computer-readable medium of claim 14, wherein the network router includes a packet routing engine that specifies one or more routes for data packets, and a packet forwarding engine that forwards the data packets according to the specified routes, and wherein the instructions cause the processor to execute a process within an operating environment executing on the packet routing engine.

24. The computer-readable medium of claim 13, further comprising:
  receiving from the client, following the replacement of the CLI process, configuration requests and operational requests encoded with extensible markup language tags;
  accessing a schema that maps the tags to configuration and operational information associated with a chassis module, a device configuration module, and a routing protocol module running on a network router;
  accessing the information associated with the software modules; and
  emitting replies encoded with extensible markup language tags according to the schema.

25. A network router management interface comprising:
  a secure protocol module that provides a secure connection between a network router and a client;
  a command line interface (CLI) module that receives CLI commands from a client; and
  a management server module that receives the CLI commands from the CLI module and, in response to one of the CLI commands, accepts commands encoded in accordance with an extensible markup languages,
  wherein the management server module replaces the CLI module with an extensible markup language-based application programming interface (API) to the client.

26. The network router management interface of claim 25, wherein the management server module:
  receives from the client configuration requests and operational requests encoded with extensible markup language tags,
  accesses a network management interface schema that maps the extensible markup language tags to configuration and operational information associated with software modules running on the network router, the software modules including a chassis software module that defines an inventory of components in the network router chassis, a device configuration software module that defines a physical configuration of the network router, and a routing protocol module that administers protocols supported by the network router,
  parses the configuration requests and the operational requests,
  accesses the corresponding configuration and operational information associated with the chassis software module, the device configuration software module, and the routing control software module according to the network management interface schema, and
  emits replies encoded with extensible markup language tags according to the network management interface schema.

27. The network router management interface of claim 26, wherein the tags include chassis tags that define output for the chassis software module, device configuration tags that define output for the device configuration software module, and routing protocol tags that define output for the routing protocol software module.

28. The network router management interface of claim 27, wherein the management server module receives at least some of the replies encoded with extensible markup language tags from one or more of the software modules.

29. The network router management interface of claim 26, wherein the management server module encodes at least some of the replies with extensible markup language tags based on non-encoded replies received from one or more of the software modules.

30. The network router management interface of claim 29, wherein the non-encoded replies include ASCII replies, and the management server module encodes the ASCII replies in extensible markup language tags to form the encoded replies.

31. The network router management interface of claim 26, wherein the extensible markup language tags are defined by one or more data type definition (DTD) files.

32. The network router management interface of claim 26, wherein the extensible markup language tags are defined by one or more XML Schema Language files.

33. The network router management interface of claim 26, wherein the configuration requests include requests to change an existing configuration of the network router, the management server module interacting with one or more of the software modules to effect the requested change.

34. The network router management interface of claim 26, wherein the extensible markup language is XML.

35. The network router management interface of claim 26, wherein the network router includes a packet routing engine that specifies one or more routes for data packets, and a packet forwarding engine that forwards the data packets according to the specified routes, and the management server module executes as a process within an operating environment on the packet routing engine.

36. A method comprising:
  establishing a secure connection between a network router and a client;
  initiating a command line interface (CLI) process on the network router;
  receiving from the client a CLI command;
  in response to the CLI command, providing an application programming interface (API) to receive configuration requests and operational requests encoded with extensible markup language tags;
  accessing a network management interface schema that maps the extensible markup language tags to configuration and operational information associated with software modules running on the network router;
  parsing the configuration requests and the operational requests;
  accessing the corresponding configuration and operational information associated with the software modules according to the network management interface schema; and
  emitting replies encoded with extensible markup language tags according to the network management interface schema.

37. The method of claim 36, wherein providing an API comprises replacing the CLI process with a management server process that provides an extensible markup language-based API to the client.

38. A network router comprising:
  a secure protocol module that provides a secure connection between a network router and a client;

a command line interface (CLI) module that receives CLI commands from a client; and a management server module that, wherein, in response to one of the CLI commands, the management server module:

receives from the client configuration requests and operational requests encoded with extensible markup language tags, accesses a network management interface schema that maps the extensible markup language tags to configuration and operational information associated with software modules running on the network router, parses the configuration requests and the operational requests, accesses the corresponding configuration and operational information associated with the software modules according to the network management interface schema, and emits replies encoded with extensible markup language tags according to the network management interface schema.

39. The network router of claim 38, wherein the management server module replaces the CLI module with the management server module and provides an extensible markup language-based application programming interface (API) to the client.

* * * * *